No. 736,108. PATENTED AUG. 11, 1903.
G. P. JONES.
HOSE COUPLING.
APPLICATION FILED NOV. 18, 1902.
NO MODEL.
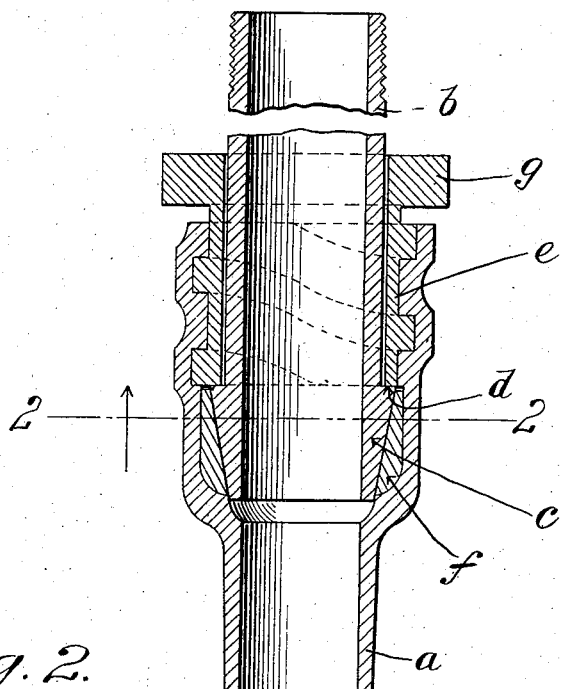
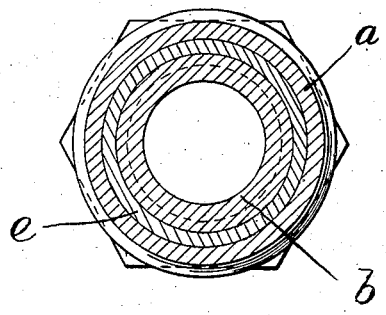
Witnesses:
Inventor:

No. 736,108. Patented August 11, 1903.

UNITED STATES PATENT OFFICE.

GOMER PHILLIP JONES, OF PENTICTON, CANADA, ASSIGNOR OF ONE-HALF TO MYRON KNOX RODGERS, OF SEATTLE, WASHINGTON.

HOSE-COUPLING.

SPECIFICATION forming part of Letters Patent No. 736,108, dated August 11, 1903.

Application filed November 18, 1902. Serial No. 131,804. (No model.)

*To all whom it may concern:*

Be it known that I, GOMER PHILLIP JONES, a subject of the King of Great Britain, residing at Penticton, in the Province of British Columbia, Canada, have invented new and useful Improvements in Hose-Couplings, of which the following is a specification.

This invention relates to pipe or hose couplings, the object of the invention being to provide a coupling of this character whereby two ends of a pipe may be rapidly and securely united in such manner as to produce a joint that will withstand high pressure without leaking.

In the drawings forming part of this application, Figure 1 is a longitudinal section of a coupling constructed according to my invention. Fig. 2 is a cross-section on line 2 2, Fig. 1, looking in the direction of the arrow on said section-line.

Referring now to the drawings, $a$ indicates one member of the coupling, adapted to be secured in the end of a piece of hose or other suitable tubular connection, and $b$ indicates the other member of the coupling, which also may be secured to a pipe in any desirable manner. One end of the member $a$ is enlarged to receive therein the member $b$, that end of which is to be inserted within the member $a$ being provided with a tapered cylindrical head $c$, the formation of which head on the end of the member $b$ resulting in a shoulder $d$. Sliding freely on the member $b$ is a nut $e$, having a relatively coarse thread cut externally thereon, this preferably being a square thread, as shown in Fig. 1, which is adapted to engage with the similarly-threaded interior surface of the enlarged portion of the member $a$. This thread in the upper end of the member $a$ only extends part way to the bottom of said enlarged portion, and between the end of said screw-thread and the lower end of said enlarged portion the interior of the latter is turned out to receive the bushing $f$. This bushing is preferably made of copper or some metal softer than the tapered head $c$ and is turned out to receive said head.

The nut $e$, as stated, slides freely on the coupling member $b$ and when unscrewed from the threaded end of the member $a$ may be slid back out of the way and the two coupling members grasped one in each hand, whereby they may be easily separated or the head $c$ be quickly seated in the bushing $f$ preparatory to screwing down the nut $e$ against the shoulder $d$ to more securely force said head into said tapered bushing and hold it there. Where it is desired to form an exceedingly tight joint, as when these couplings are used on pipes adapted to carry high pressures, the nut $e$ is preferably provided with a head $g$, squared off to receive a wrench, or this head may be knurled, whereby the nut may be screwed up by hand. The nut is made with a wall of such thickness that when it is withdrawn and slid back on the part $b$ of the coupling there is ample space to permit the easy insertion and withdrawal of the head $c$. Furthermore, it is desirable to so fashion the head $c$ that it may come to a full bearing within the bushing without permitting the end of the nut to be screwed down against the top of the bushing, and to that end the length of the head should slightly exceed the height of the bushing.

To guard against leaking, it is desirable that whether water or air under pressure be passed through this coupling these substances should not have access to the bushing, whereby any grit or similar material carried thereby might find its way between the surface of the head $c$ and the bushing or work in between the bushing and the wall of the member $a$; and to this end I prefer to make the head $c$ so that when it comes to a bearing in the bushing the lower end of the head will overlap slightly the lower edge of the bushing, and in this manner a continuous passage is formed from one of the coupling members to the other.

To insert the bushing $f$ in its place in the turned-out lower end of the enlarged part of the member $a$, it may be made small enough in diameter to pass through the screw-threaded portion of said member and then be expanded to fit the place turned out to receive it.

Having thus described my invention, what I claim, and desire to secure by Letters Patent of the United States, is—

A pipe-coupling consisting of a member having an enlarged extremity internallly screw-threaded, an internally-tapered metal bushing in said member located below the end of said threaded portion; together with a second coupling member, a tapered head on the extremity thereof entering the first-named member and adapted to be seated in said bushing, a nut loosely slidable on said second member and adapted to be screwed into said first-named member against a shoulder back of said head to seat the latter in the bushing forcibly.

GOMER PHILLIP JONES.

Witnesses:
L. C. BARNES,
E. B. RICHARDSON.